United States Patent [19]
Kuratani

[11] Patent Number: 4,887,006
[45] Date of Patent: Dec. 12, 1989

[54] DIMMER CONTROL CIRCUIT

[75] Inventor: Junichi Kuratani, Miyagi, Japan

[73] Assignee: Alps Electric Co., Ltd., Tokyo, Japan

[21] Appl. No.: 204,484

[22] Filed: Jun. 9, 1988

[30] Foreign Application Priority Data

Sep. 17, 1987 [JP] Japan ............................ 62-140857[U]

[51] Int. Cl.$^4$ .......................... H02H 3/20; H05B 39/04
[52] U.S. Cl. ................................ 315/209 R; 315/119;
315/209 T; 315/225; 315/291
[58] Field of Search ......... 315/209 R, 209 T, 209 SC,
315/291, DIG. 4, 225, 119, 120; 340/321, 331,
332

[56] References Cited

U.S. PATENT DOCUMENTS

| Re. 29,589 | 3/1978 | Inoue | 315/225 |
|---|---|---|---|
| 3,949,347 | 4/1976 | Gilbreath | 338/172 |
| 4,168,453 | 10/1979 | Gerhard et al. | 315/225 |
| 4,321,509 | 3/1982 | Miyaji et al. | 315/225 |
| 4,739,226 | 4/1988 | Murata | 315/209 R |

Primary Examiner—Donald J. Yusko
Assistant Examiner—Brian Palladino
Attorney, Agent, or Firm—Guy W. Shoup; Paul J. Winters; Brian D. Ogonowsky

[57] ABSTRACT

A dimmer control circuit having time constant regulating means provided in a multivibrator for regulating the load time ratio of the output pulse signal of the multivibrator to control ON, OFF the voltage of a battery applied to a lamp by the output pulse signal to thereby regulate the luminous intensity of the lamp comprising stopping means provided in the multivibrator for operating near the end of the regulation in a direction for increasing the luminous intensity of the lamp by the time constant regulating means and stopping the operation of the multivibrator. Thus, the dimmer control circuit can stop the operation of the multivibrator near the end of regulation in a direction for increasing the luminous intensity of a lamp to control the connection of a battery directly to the lamp with a fine current.

6 Claims, 2 Drawing Sheets

DIMMER CONTROL CIRCUIT

BACKGROUND OF THE INVENTION

1. Field of the Invention

This invention relates to a dimmer control circuit for regulating the luminous intensity of a lamp provided on an operation panel for a vehicle.

2. Description of the Prior Art

A conventional dimmer control circuit having time constant regulating means and a free-running multivibrator for controlling the luminous intensity of a lamp by regulating the time constant regulating means is heretofore used as constructed in FIG. 2.

As shown in FIG. 2, a resistor 2 is connected at the input side of a digital amplifier 1 between a bias terminal $t_1$ and a signal terminal $t_2$, and a transistor 3 is connected at its collector to the signal terminal $t_2$ and at its emitter to an earth terminal $t_3$. A predetermined voltage is applied to the bias terminal $t_1$, and the earth terminal $t_3$ is grounded. The regulating terminal of a variable resistor 4 is connected to the bias terminal $t_1$, and the resistor 4 is connected at both ends through resistors 5 and 6 to the one electrodes of capacitors 7 and 8.

Further, the other electrode of the capacitor 7 is connected to the signal terminal $t_2$, and the other electrode of the capacitor 8 is connected through a resistor 9 to the bias terminal $t_1$. The anode of a diode 10 is connected to the connecting point of the capacitor 7 to the resistor 5, the cathode of the diode 10 is connected to the base of a transistor 11, the emitter of the transistor 11 is connected to the earth terminal $t_3$, and the collector is connected to the connecting point of the capacitor 8 and the resistor 9.

Similarly, the connecting point of the capacitor 8 to the resistor 6 is connected to the anode of a diode 12, and the cathode of the diode 12 is connected to the base of the transistor 3.

A lamp 13 is connected at the output side of the digital amplifier 1 in FIG. 2 between a bias terminal $t_4$ and a signal terminal $t_5$, and a battery 14 is connected between the bias terminal $t_4$ and an earth terminal $t_6$.

As described above, a free-running multivibrator 15 is located at the input side of the digital amplifier 1, the variable resistor 4 is provided as time constant regulating means, the low voltage and current of the input side are amplified by the digital amplifier 1, the battery 14 to the lamp 13 is controlled ON or OFF at the output side to regulate the luminous intensity of the lamp 13.

In the conventional dimmer control circuit constructed as described above, when the resistance value of the variable resistor 4 is varied, the load time ratio (duty ratio) of the ratio of the pulse continuation time to the pulse time of the output pulse signal of the multivibrator 15 is varied.

The variation of the load time ratio causes the voltage of the battery 14 applied to the lamp 13 to be controlled ON or OFF by the digital amplifier 1, and when the load time ratio is reduced, the ON time of the voltage of the battery 14 is increased in response to the reduction of the load time ratio, thereby increasing the luminous intensity of the lamp 13.

When the load time ratio is increased, the ON time of the voltage of the battery 14 is decreased in response to the increase in the load time ratio, thereby reducing the luminous intensity of the lamp 13.

In this manner, in the conventional dimmer control circuit described above, the luminous intensity of the lamp 13 can be controlled by varying the resistance value of the variable resistor 14.

In the conventional dimmer control circuit described above, when the variable regulator 4 is set to a position for maximum luminous intensity of the lamp 13, the multivibrator 15 remains unstable during the maximum luminous intensity of the lamp 13.

Consequently, during maximum luminous intensity of the lamp 13, since a positive output pulse signal of narrow pulse width is outputted from the multivibrator 15, the luminous intensity of the lamp 13 is finely flickered, and wasteful power is consumed at the input side of the digital amplifier 1.

To prevent this flickering, a dimmer control circuit of a configuration as shown in FIG. 3 has been proposed.

In the dimmer control circuit proposed as described above, where the same numerals as those in FIG. 2 denote the same or equivalent components in FIG. 3, a switch 16 is provided between a signal terminal $t_5$ and an earth terminal $t_6$ at the output side of a digital amplifier 1, and the switch 16 is closed through the digital amplifier 1 near the end of a regulating direction for increasing the luminous intensity of the lamp 13 of the variable resistor 4.

Thus, in the dimmer control circuit proposed as described above, when the resistance value of the variable resistor 14 is regulated in a direction for increasing the luminous intensity of the lamp 13, the switch 16 is closed near the end of the regulation that the luminous intensity of the lamp 13 becomes maximum. Therefore, the voltage of the battery 14 is directly applied to the lamp 13 so that the lamp 13 becomes maximum in its luminous intensity.

Thus, in the dimmer control circuit proposed as described above, the lamp 13 can irradiate stable illumination light without fine flicker in the maximum luminous intensity state, but since a relatively large current flows at the output side of the digital amplifier 1, the switch 16 needs the contact capacity of approx. 3 to 10 A for controlling the current of the lamp 13.

Wasteful power is consumed at the input side of the digital amplifier 1 due to the irregularity in the circuit components of the multivibrator 15 and the digital amplifier 1 or the variation in the operating conditions even in the maximum luminous intensity state of the lamp 13.

SUMMARY OF THE INVENTION

Accordingly, an object of this invention is to provide a dimmer control circuit which can eliminate the above-mentioned drawbacks and stop the operation of the multivibrator near the end of regulation in a direction for increasing the luminous intensity of a lamp to control the connection of a battery directly to the lamp with a fine current.

In order to achieve the above and other objects of the invention, there is provided a dimmer control circuit having time constant regulating means provided in a multivibrator for regulating the load time ratio of the output pulse signal of the multivibrator to control ON, OFF the voltage of a battery applied to a lamp by the output pulse signal to thereby regulate the luminous intensity of the lamp. The dimmer control circuit further comprises a switch means provided in the multivibrator. The switch means is actuated when the time constant regulating means is at a position corresponding to maximum luminous intensity of the lamp, and by its actuation prevents operation of the multivibrator.

In this case, when the time constant regulating means is regulated in a direction for increasing the luminous intensity of the lamp, and the switch means is actuated near the position of the end of the regulation to stop the operation of the multivibrator the batter is applied directly to the lamp.

This switch means is provided in the multivibrator to completely stop the operation of the multivibrator in the maximum luminous intensity state of the lamp, thus entirely eliminating the fine flicker of the lamp.

The above and other relates objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to the accompanying drawings.

Figure 1:
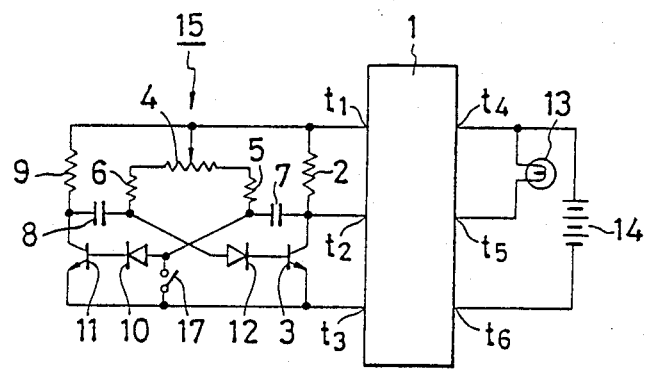
FIG. 1 is a circuit diagram showing a configuration of an embodiment of a dimmer control circuit according to the present invention.
Figure 2:
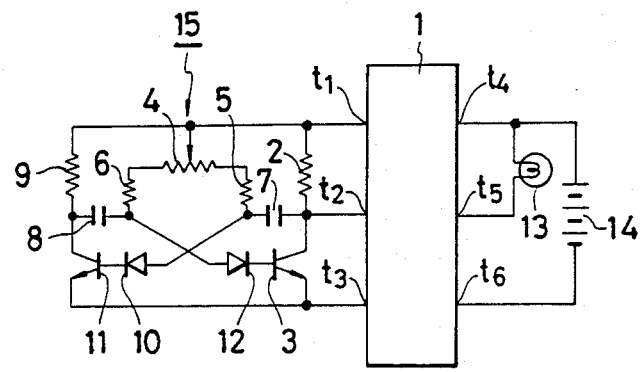
FIG. 2 is a circuit diagram showing a configuration of a conventional dimmer control circuit.
Figure 3:
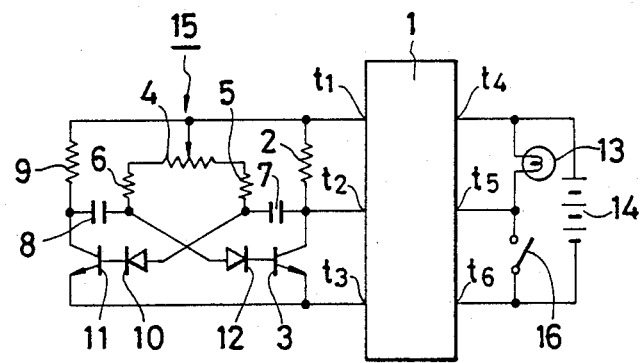
FIG. 3 is a circuit diagram showing a configuration of a dimmer control circuit proposed heretofore.

FIG. 1 is a circuit diagram showing an embodiment of a dimmer control circuit according to the present invention, wherein the same reference numerals as those in FIGS. 2 and 3 denote the same or equivalent components.

As shown in FIG. 1, the embodiment of the present invention comprises a switch 17 provided between the anode side of a diode 10 and an earth terminal $t_3$ at the input side of a digital amplifier 1 as compared with a conventional dimmer control circuit shown in FIG. 2.

In the embodiment of the present invention, when a variable resistor 4 is slid in a direction for increasing the luminous intensity of a lamp 13, the switch 17 is closed ON near the position of the end of the sliding regulation, an earth terminal $t_6$ is substantially connected to a signal terminal $t_5$ by the digital amplifier 1 at the same time to apply the battery 14 directly to the lamp 13. In the embodiment of the invention as described above, the variable resistor 4 forms time constant regulating means, and the switch 17 forms the switch means.

The operation of the embodiment of the invention having the construction as described will be described.

In the embodiment of the invention described above, when the regulating terminal of the variable resistor 4 is slid, the load time ratio of the ratio of the pulse time of the output pulse signal of the multivibrator 15 to the continuation time is varied.

In the embodiment described above, when the variable resistor 4 is regulated to be slid in a direction for increasing the load time rate, the OFF control time of the voltage of the battery 14 applied to the lamp 13 by the digital amplifier 1 is lengthened to vary the luminous intensity of the lamp 13 in a direction of decreasing it.

When the variable resistor 4 is regulated, on the contrary, to be slid in a direction for decreasing the load time ratio, the ON control time of the voltage of the battery 14 applied to the lamp 13 by the digital amplifier 1 is lengthened to vary the luminous intensity of the lamp 13 in a direction for increasing the luminous intensity.

Therefore, when the regulating terminal of the variable resistor 4 is slid from the regulating position of the variable resistor 4 of the position where the luminous intensity of the lamp 13 is minimum, the luminous intensity of the lamp 13 is gradually increased.

When the regulating position of the variable resistor 4 has arrived at the position for maximum luminous intensity position of the lamp 13, the switch 17 is closed. Thus, the potential of the anode side of the diode 10 becomes an earth potential, and the multivibrator 15 stops oscillating. Simultaneously, in the digital amplifier 1, the earth terminal $t_6$ is substantially connected to the signal terminal $t_5$ to apply the voltage of the battery 14 directly to the lamp 13.

Since the operation of the multivibrator 15 is stopped in this state, the output pulse signal of the fine pulse width is not outputted from the multivibrator 15 due to the irregularity in the circuit components of the multivibrator 15 and the digital amplifier 1 or the variation in the operating conditions to completely prevent the fine flicker of the lamp 13.

Since the switch 17 is provided in the multivibrator 15 at the input side of the digital amplifier 1, it can be controlled by a fine current of several mA. For example, it can be performed by forming by printing Ag pattern at the position of the end of sliding regulation in a direction for sliding to increase the luminous intensity of the lamp 13 of the variable resistor 4, thereby reducing the manufacturing cost.

Further, no power consumption occurs at the input side of the digital amplifier 1 in the maximum luminous intensity state of the lamp 13, thus preventing the wasteful power consumption.

In the embodiments described above, the time constant regulating means employs the variable resistor provided in the multivibrator. However, the present invention is not limited to the particular embodiment. For example, a variable capacitor provided in the multivibrator may be used as time constant regulating means.

In the embodiments described above, the switch means employs the switch provided the anode of the diode of the multivibrator and the earth. However, the present invention is not limited to the particular embodiment. For example, the switch may be provided at the cathode side of the diode, and the switch may be provided at the position for turning ON, OFF a power source to the multivibrator.

According to the dimmer control circuit of the present invention as described above, the lamp can be turned ON without fine flicker by the control of the multivibrator in the maximum luminous intensity state of the lamp, and the dimmer control circuit can be manufactured inexpensively.

What is claimed is:

1. An improved dimmer control circuit having a time constant regulating means provided in a multivibrator for regulating a load time ratio of an output pulse signal generated by said multivibrator, said output pulse being used to control, ON or OFF, a voltage applied to a lamp to thereby regulate luminous intensity of said lamp, said improvement comprising:
    switch means connected within said multivibrator for rendering said multivibrator inoperative when said switch means is actuated, said switch means being actuated by said time constant regulating means when said time constant regulating means is in a position corresponding to maximum luminous intensity of said lamp, said multivibrator, when rendered inoperative, precluding flickering of said lamp during maximum luminous intensity.

2. A dimmer control circuit according to claim 1, wherein the time constant regulating means for regulating the load time of the output pulse signal of the multivibrator is a variable resistor provided in the multivibrator.

3. A dimmer control circuit according to claim 1, wherein the time constant regulating means for regulating the load time of the output signal of the multivibrator is a variable capacitor provided in the multivibrator.

4. A dimmer control circuit according to claim 1 wherein said switch means is formed as part of said time constant regulating means and is actuated when said time constant regulating means is in a position corresponding to maximum luminous intensity of said lamp.

5. A dimmer control circuit according to claim 4 wherein said switching means is a switch provided between a cathode side of a diode in said multivibrator and ground.

6. A dimmer control circuit according to claim 4 wherein said switch means is a switch provided between an anode side of a diode in said multivibrator and ground.

* * * * *